United States Patent [19]

Tholl

[11] Patent Number: 5,352,475
[45] Date of Patent: Oct. 4, 1994

[54] PROCESS FOR THE PRODUCTION OF LOW-CALORIE SPREADS

[75] Inventor: George W. Tholl, Pewee Valley, Ky.

[73] Assignee: United Dominion Industries, Inc., Charlotte, N.C.

[21] Appl. No.: 43,442

[22] Filed: Apr. 6, 1993

Related U.S. Application Data

[63] Continuation-in-part of Ser. No. 6,656, Jan. 22, 1993.

[51] Int. Cl.$^5$ ............................................. A23D 7/04
[52] U.S. Cl. ................................... 426/603; 426/601; 426/602
[58] Field of Search ..................... 426/601, 602, 603

[56] References Cited

U.S. PATENT DOCUMENTS

| | | |
|---|---|---|
| Re. 21,406 | 3/1940 | Vogt . |
| 4,087,565 | 5/1978 | Ebskamp ............................... 426/603 |
| 4,177,293 | 12/1979 | Forman et al. . |
| 4,217,372 | 8/1980 | Ebskamp ............................... 426/603 |
| 4,279,658 | 7/1981 | Harvey et al. . |
| 4,568,556 | 2/1986 | McCoy ................................. 426/603 |
| 4,615,892 | 10/1986 | Morehouse et al. . |
| 5,053,241 | 10/1991 | Mongeau ............................... 426/603 |
| 5,096,732 | 3/1992 | Mongeau ............................... 426/603 |
| 5,151,290 | 9/1992 | Norton et al. ....................... 426/576 |
| 5,169,668 | 12/1992 | Milo ..................................... 426/603 |
| 5,244,688 | 9/1993 | Norton ................................. 426/602 |

OTHER PUBLICATIONS

Bailey's Industrial Oil and Fat Products, 3rd Edition, pp. 344-349.
Encyclopedia Of Food Science and Technology, vol. 3, pp. 1643-1644.

*Primary Examiner*—Carolyn Paden
*Attorney, Agent, or Firm*—Fitch, Even, Tabin & Flannery

[57] ABSTRACT

This invention is for a process for producing a water-in-oil emulsion and edible margarine-like spread composition having a fat content of less than 80 percent by weight and having the approximate consistency of margarine, the process comprising forming a liquid dispersion of a water phase and a liquid fat phase of a substantially hard fat and a liquid soft fat, followed by cooling of the dispersion and subjecting the cooled dispersion to a shearing force sufficient to produce a water-in-oil emulsion, and discharging the emulsion to provide a product having the approximate consistency of margarine at room temperature. This invention is also for a process for producing a water-in-oil emulsion containing relatively high levels of a hydrocolloid, having a fat content of less than 80 percent by weights, and having the approximate consistency of margarine, the process comprising forming a separate water phase containing the hydrocolloid and a separate liquid fat phase of a substantially hard fat and a liquid soft fat, cooling the separate liquid fat phase to effect partially crystallization of the fat, followed by blending the water phase and the partially crystallized fat phase whereby the crystallized fat remains substantially crystallized and then subjecting the blended mixture containing the water phase and partially crystallized fat phase to a shearing force to produce a water-in-oil emulsion, and then discharging the emulsion to provide a product having the approximate consistency of margarine at room temperature. Compositions prepared having a relatively high level of hydrocolloids generally have larger dispersed water droplets and, therefore, higher perceived flavor bursts.

20 Claims, No Drawings

PROCESS FOR THE PRODUCTION OF LOW-CALORIE SPREADS

CROSS-REFERENCE TO RELATED APPLICATION

The present application is a continuation-in-part of U.S. patent application Ser. No. 08/006,656, filed Jan. 22, 1993.

FIELD OF THE INVENTION

The present invention generally relates to the production of comestible spreads and more particularly relates to edible spreads useful as margarine substitutes having reduced caloric content.

BACKGROUND OF THE INVENTION

In recent years considerable attention has been directed to the provision of comestible spreads resembling margarine but having reduced fat and caloric content. By government regulation, a "margarine" product must contain at least 80% fat by weight. Margarines comprise a water phase and an oil phase which are emulsified. Margarines generally are in the form of a water-in-oil emulsion. The taste of margarines and low fat edible spreads is due mostly to water soluble flavors, oil soluble flavors, and salt included in the water phase. The release of the water soluble flavors and salt from the encapsulating oil phase provides to the consumer a burst of flavor customarily associated with these products. The amount of flavor burst the consumer perceives is primarily a function of the droplet size of the encapsulated water phase. A very tight water-in-oil emulsion with a relatively small water phase droplet size yields a small flavor burst while a more loose emulsion with a larger encapsulated water droplet size generally provides a larger flavor burst. In the prior art, low calorie spreads, "functional" ingredients are often added to control droplet size. Thus, proteins from dairy sources, such as whey powder or non-fat dry milk solids, are commonly used to destabilize the emulsion and to counteract the effect of added emulsifying agents to thus increase the droplet size of the water phase and increase the flavor burst.

Moreover, prior art processes for producing low fat edible spreads resembling margarine generally used the same equipment as margarine processes and consisted of multiple scrape-surface heat exchangers and pin-working units as described in *Bailey's Industrial Oil and Fat Products*, 3rd Edition, pp. 344–349. Equipment of this type involves considerable capital expenditure, residence times which are relatively lengthy, and substantial energy and/or operating costs.

It is a principal object of this invention, therefore, to provide improved low calorie spreads closely resembling margarine in appearance, texture and mouthfeel which can be produced in an economical manner.

It is a further object of this invention to produce in a simple manner, low calorie spreads having theological, textural and flavor release characteristics similar to margarine with considerably reduced fat content from margarine.

SUMMARY OF THE INVENTION

This invention provides, as a first major embodiment, a process for producing an edible margarine-like spread composition comprising a water-in-oil emulsion having a fat content of less than about 80% by weight and having the approximate consistency of margarine at room temperature which comprises: (a) forming an edible liquid dispersion including a water phase, and a fat phase comprising a blend of a melted solid or hard fat and a liquid fat, (b) cooling the said liquid dispersion to a temperature sufficient to effect substantial solidification of the hard fat, (c) then subjecting the cooled dispersion to a shearing force sufficient to produce a water-in-oil emulsion, and discharging the water-in-oil emulsion from the action of the shearing force so as to provide an edible water-in-oil emulsion having the approximate consistency of margarine at room temperature.

In a second major embodiment, this invention also provides a process for producing a water-in-oil emulsion which is an edible margarine-like spread composition having a fat content of less than about 80 percent by weight and approximate consistency of margarine at room temperature, said process comprising: (a) forming a water phase containing about 0.5 to 30 percent by weight of a hydrocolloid; (b) forming a liquid fat phase containing a substantially hard fat and a liquid soft fat; (c) cooling the liquid fat phase to form a partially crystallized fat phase; (d) blending the water phase and partially crystallized fat phase to form a liquid dispersion such that the crystallized fats from the partially crystallized fat phase remain substantially crystallized; (e) subjecting the liquid dispersion to a shearing force sufficient to produce a water-in-oil emulsion wherein the maximum droplet size of the dispersed water phase is less than about 400 microns; and (f) discharging the water-in-oil emulsion to provide an edible margarine-like spread composition having a fat content of less than about 80 percent by weight and approximate consistency of margarine at room temperature.

The incorporation of relatively high levels of hydrocolloids (i.e., levels greater than about 0.1 percent by weight) in the compositions of this invention generally allows for better control of the dispersed water phase droplet size and allows for the formation of larger water phase droplets, with a larger perceived flavor burst, when compared to similar compositions without the hydrocolloids and prepared under similar processing conditions. As explained in greater detail below, however, the incorporation of relatively high levels of hydrocolloids into the compositions of this invention requires certain process modifications.

DESCRIPTION OF THE PREFERRED EMBODIMENTS

The first major embodiment of the present invention involves a process for the production of edible, water-in-oil, margarine-like compositions which do not contain significant amounts of hydrocolloids (i.e., less than about 0.05 percent by weight). The second major embodiment of the present invention involves a process for the production of edible, water-in-oil, margarine-like compositions which contain significant amounts of hydrocolloids. Each of these major embodiments is discussed in turn below.

The fat components of the dispersion employed to form a spread in accordance with the invention is a blend of a solid or hard fat which has a Wiley Melting Point in the range of about 90° to 120° F., and a liquid fat which has a Wiley Melting Point less than about 32° F. The percentage of hard fat to liquid fat in the blend can be varied widely. As is known, the Solid Fat Index (SFI) is the ratio of hard fat to liquid fat and is a well accepted method used to classify fat mixtures and is Method CD-10-57 of the American Oil Chemists Society. A preferred fat blend typically comprises between about 10 and about 45 weight percent of a hard fat based upon the total weight of fat, the hard fat having an Iodine Value (IV) of about 55 to about 85 and a Wiley Melting Point in the range of 90° to 120° F.; and between about 55 to about 90 weight percent of a liquid fat based upon the total weight of fat, the liquid fat having an Iodine Value of between about 115 to 150 and a Wiley Melting Point less than 32° F.

The fats for the spreads produced by this invention may be formulated from a variety of edible fatty triglycerides such as soybean oil, cottonseed oil, peanut oil, olive oil, palm oil, corn oil, rapeseed oil, sunflower seed oil, sesame oil, safflower oil, sardine oil, lard and tallow, or mixtures thereof. Vegetable oils are preferred over animal oils and oils that quickly solidify are generally preferred over other oils. Soybean oil, either solid or liquid, are particularly preferred fats to provide the part fat and liquid fat.

According to one preferred embodiment of the invention, a dispersion comprising a water phase and a suitable fat blend is formed at a temperature at which the SFI of the fat blend is zero, that is, the fats are completely in liquid state. Preferably, the water and fat blend dispersion is formed at a temperature of not more than 30° F. above the temperature at which the SFI is zero. The water phase is employed in amounts of from about 25% to 85% by weight of the product and the fat phase comprises 15% to 75% by weight of the product.

Minor amounts of optional ingredients can be included in the water phase of the formulation to achieve a desired flavor and to retard microbiological deterioration of the final product during storage. Typical optional ingredients which can be incorporated in the water phase are:

| Salt, NaCl | 0.5 to 3.0 wt % |
|---|---|
| Flavor - water soluble | 0.0.1 to 0.03 wt % |
| Potassium sorbate | 0.0005 to 0.002 wt % |
| EDTA | 50 to 100 ppm |
| Dairy proteins | 0 to 0.1 wt %. |

Also, the fat or oil phase of the formulation can include known oil-soluble flavors in minor amounts such as from 0.1% to 0.2% by weight of the formulation and coloring agents such as beta carotene in an amount of about 0.005% by weight.

An emulsifying agent of known type, such as monoglycerides and lecithin, is employed in the formulation generally in an amount of about 0.25% to 1.0% by weight of the formulation. The emulsifying agent is preferably added to the water and oil mixture but can also be added in slightly higher concentrations to the oil phase.

The dispersion of water and fat blends can be formed by adding them to a blending tank in batchwise manner, or the water and fat blends can, in a continuous process, be separately metered into a blending tank. In any event, the water-fat blend dispersion is then cooled from the initial mixing temperature (usually 120° to 150° F.) to a temperature below the temperature at which the hard fat solidifies; preferably the dispersion is cooled to a temperature in the range of 35° to 45° F. Preferred cooling rates are in the range of 1° F. per second to 8° F. per second.

While various equipment can be employed to cool the water-fat dispersion, it is highly desirable and preferred that a tubular heat exchanger of known type be utilized which produces sufficient flow turbulence to insure that the solidifying fat will not plate out on the surface of the heat exchanger so as to alter the composition of the final product. The cooled dispersion is preferably maintained at the selected temperature for a period to insure that the hard fat (i.e., the high melting fat) is solidified. However, it is not altogether necessary to use this holding step. Thus, holding can be effected from 0 to 5 minutes, but preferably is effected by maintaining the dispersion for a period of 0.5 to 2 minutes in a holding tube connected to the tubular heat exchanger. Average flow velocities through the holding tube commonly range from about 2 feet per second to about 6 feet per second.

After cooling and any holding, and when the hard fat is substantially solidified, the dispersion is subjected to mechanical shearing whereby the dispersion is emulsified to a water-in-oil (w/o) emulsion. The emulsified product, after being subjected to mechanical shearing is preferably held for a tempering period of say 4 to 24 hours in the temperature range of 70° to 80° F., is a stable emulsified plastic solid having the consistency of tub margarine at room temperature.

Various known high shear devices for imparting mechanical shear to liquids can be used to form the water-in-oil emulsion, such as, for example, dispersers, shear pumps, emulsifiers, colloid mills, high speed wet mills, jets, high intensity mixers and the like. The shearing device should possess a large mixing volume as compared to the droplet size of the dispersion fed to the shearing device to insure a consistent water-to-oil ratio in the final product and homogeneous fluid-fluid interactions between the two phases. The water-to-oil ratio will be determined by the proportion of water phase and oil phase fed into the process.

The mechanical shearing of the dispersion should be conducted for a time and at a rate to reduce the largest consistent dispersed water phase droplet size below 500 microns (0.5 mm) as determined from an optical microscope to ensure that interfacial phenomena hinders the coalescence of the emulsified water droplets under static conditions. Preferably, the droplet size will be less than 400 microns and greater than 100 microns.

Typically, the dispersion fed to the shearing device has a viscosity of between about 5 to about 25 centipoises and the emulsified product has a yielding viscosity of 10,000 to 10,000,000 centipoises where the yielding viscosity is defined as the viscosity at the yielding point of the plastic solid material. It is well known in the literature that as the interfacial surface area between the two phases increases, the yielding viscosity and stress will increase. A decrease in droplet size yields an increase in interfacial surface area, hence as droplet size decreases, the yielding viscosity and stress will increase. This relationship holds for any particular formulation. The yielding stress should be between about 20 Pa and about 950 Pa and preferably between about 60 Pa and about 700 Pa.

During mechanical shearing, the temperature of the materials undergoing shear increases due to frictional/viscous interactions. The temperature rise of the fluids during shearing correlates with the yielding viscosity and yielding stress, and hence with the droplet size of the dispersed water in the emulsified product providing the temperature does not rise above the melting point of a significant fraction of the hard fat. So as to achieve a relatively small droplet size for the water in the emulsified product, the mechanical shearing is conducted so as to limit the temperature rise in the fluid mixture undergoing shear to less than 50° F. Preferably the temperature rise is maintained in the range of from 5° to 20° F.

In a second major embodiment, this invention also relates to the preparation of similar compositions which contain, in addition to the components noted above, relatively high levels of hydrocolloids (i.e., levels greater than about 0.1 percent by weight). The addition of hydrocolloids generally allows for the formation of larger dispersed water phase droplets. Such larger dispersed water phase droplets generally provide enhanced perceived flavor burst when compared to similar compositions without the hydrocolloids.

Attempts to simply add hydrocolloids at relatively high levels to either the water phase or oil phase in the above described first major embodiment or process (i.e., cooling a liquid dispersion containing a water phase and a liquid fat phase having both hard and soft fats in order to solidify or crystallize the hard fat prior to emulsification) have generally not been as successful as desired. The incorporation of a hydrocolloid at such relatively high levels appears to inhibit fat crystallization during the cooling step. The crystallization of the hard fats in the compositions of the present invention is necessary to stabilize the water-in-oil emulsions.

Modifications have been made to the basic process described above which allow the ready formation of stable water-in-oil emulsions which contain relatively high levels of hydrocolloids. In general, the basic process is modified so that the liquid hard fat phase containing a substantially hard fat and a liquid soft fat is cooled to at least partially crystallize the fat phase prior to blending with a water phase containing a hydrocolloid. The blending of the partially crystallized fat phase and the water phase containing a hydrocolloid is carried out such that the crystallized fats from the partially crystallized fat phase remain substantially crystallized. In this way, the inhibiting effect of the added hydrocolloid on the crystallization of the fats is avoided (or at least minimized) since the fats are already crystallized before contact with the added hydrocolloid. Of course, during further processing, the fats must remain in the crystallized state or the inhibiting effect of the hydrocolloid can reassert itself.

Generally, the same components and optional ingredients (as well as relative amounts) as described above in the first major embodiment of this invention are useful and acceptable in compositions containing relatively high levels of hydrocolloids. The hydrocolloids used in the present compositions and process must, of course, be acceptable in food compositions. Suitable hydrocolloids include water soluble proteins, gums, gelatins, starches, and the like. Preferred hydrocolloids include naturally-occurring proteins, including, for example, casein, whey, and nonfat milk solids. Especially preferred hydrocolloids include calcium caseinate, sodium caseinate, whey, nonfat dry milk, maltodextrins, and coldset gelatins. If desired, mixtures of hydrocolloids can be used. Generally the hydrocolloid is present in the water phase at about 0.5 to 30 percent by weight and preferably at about 1 to 10 percent by weight. The resulting water-in-oil emulsions, therefore, will generally contain about 0.1 to 25 percent by weight hydrocolloid and preferably about 0.25 to 8 percent by weight hydrocolloid.

The present process for preparing compositions containing relatively high levels of hydrocolloids involves first forming a separate water phase containing about 0.5 to 30 percent by weight, and preferably about 1 to 10 percent by weight, of a hydrocolloid and a separate liquid fat phase containing a substantially hard fat and a liquid soft fat. The water phase in this second major embodiment may contain, in addition to the hydrocolloids, the same ingredients and components as the water phase in the first major embodiment described above. And the liquid fat phase may containing the same types of fats and other components as the liquid fat phase in the first major embodiment described above.

Preferably the ratio of the hard fat to the soft fat is in the range of about 0.1 to 0.8 in the liquid fat phase. Preferably the hard fat has an iodine value of about 55 to 85 and a Wiley melting point of about 90° to 120° F. and the soft fat has an iodine value of about 115 to 150 and a Wiley melting point of less than 32° F. The liquid fat phase is preferably formed by heating the mixture of hard fat and soft fat to a temperature of about 100° to 150° F.

The liquid fat phase is next cooled to a temperature sufficient to form a partially crystallized fat phase. By "partially crystallized fat phase" it is meant that more than about 60 percent by weight, and preferably more than about 80 percent by weight, of the hard fat in this phase is solidified or crystallized. Preferably the liquid fat phase is cooled to about 10° to 50° F. to effect the crystallization of the fats therein and form the partially crystallized fat phase. Preferably, the liquid fat phase is cooled using a scraped surface heat exchanger. Even more preferably, the partially crystallized fat phase from the scraped surface heat exchanger or other cooling device is further crystallized in a holding or recrystallization tube at a temperature of about 15° to 55° F. Generally, further crystallization in the holding or recrystallization tube can be effected by passage through the cooled tube for a time less than about 5 minutes and, preferably, between about 0.5 to 2 minutes.

The partially crystallized fat phase is then blended with the water phase to form a liquid dispersion in such a manner that the crystallized fats in the partially crystallized fat phase remain substantially crystallized. Preferably, the temperature of the water phase is about 30° to 50° F. prior to the blending step. The water phase can be passed through, and preferably is passed through, a plate pasteurizer/cooler prior to blending with the partially crystallized fat phase. The temperature of the liquid dispersion should be sufficiently low to prevent significant loss of the hard fats in the crystallized form; generally a temperature for the liquid dispersion in the range of about 30° to 50° F. is acceptable.

After the blending step, the liquid dispersion containing crystallized fat is subjected to mechanical shearing whereby the dispersion is emulsified to form a water-in-oil emulsion. The emulsification step is essentially carried out in the same manner as described above for preparation of emulsions without significant levels of hydrocolloids. Various high shear devices, as described above, can be used to form the desired water-in-oil emulsion from the blended mixture. The temperature of the blended mixture and the resulting emulsion should be maintained such that the crystallized fats remain crystallized. Suitable temperature ranges can, of course, vary depending on the specific hard fat or hard fats used. It is generally preferred that the temperature of the emulsion exiting in the emulsifying device is (1) higher than the initial temperature of the blended mixture and (2) in the range of about 40° to 70° F. If desired or necessary, the blended mixture can be cooled during emulsification to keep the temperature in acceptable ranges. The emulsion formed can, if desired, be tempered at about 70° to 80° F. for about 4 to 24 hours.

The water-in-oil emulsions containing relatively high levels of hydrocolloids generally exhibit larger water phase droplets when compared to similar compositions containing only small amounts or no hydrocolloids and prepared under similar processing conditions. The large water phase droplets generally result in a product with a larger perceived flavor burst. Generally, compositions containing relatively high levels of hydrocolloids have maximum water phase droplet sizes in the range of about 100 to 400 microns. Preferably, the water phase droplet size in these compositions is in the range of about 100 to 350 microns.

The following specific examples further illustrate the invention and the advantages thereof.

EXAMPLE 1

A formulation was prepared composed of about 60 weight percent water phase and about 40 weight percent oil phase and contained the following ingredients:

| Water Phase | |
|---|---|
| Water | 58.0 wt % |
| Salt, NaCl | 2.0 wt % |
| Flavor - water soluble imitation butter | 0.02 wt % |
| Potassium sorbate | 0.001 wt % |
| EDTA | 75 ppm |
| Oil Phase | |
| Liquid soybean oil | 29.3 wt % |
| Solid soybean oil | 10.0 wt % |
| Flavor - oil soluble imitation butter | 0.15 wt % |
| Beta carotene | 0.004 wt % |
| Emulsifying agent - distilled monoglycerides (<10% diglycerides) | 0.5 wt % |

The solid soybean oil had a Wiley Melting Point in the range of 102°–108° F., an Iodine Value in the range of 65–73 and a solid fat index (SFI) as follows:

| Solid Soybean Oil | |
|---|---|
| Temperature | SFI |
| 50° F. | 54–58 |
| 70° F. | 40–44 |
| 80° F. | 35–39 |
| 92° F. | 15–19 |
| 104° F. | 4.0 maximum |

A dispersion of the above ingredients was prepared by adding the water phase ingredients to a tank followed by the addition of all oil phase ingredients after which the emulsifying agent was added. The mixture in the blend tank was equilibrated to 120° F. After equilibration, the oil and water dispersion was pumped from the blend tank through tubular heat exchangers in which the dispersion was cooled to 40° F. at a cooling rate of 5° F. per second. The dispersion was passed through a holding tube or cooling section of the exchanger for 30 seconds following which it was introduced into a mechanical shearing device.

The mechanical shearing device consisted of two sets of closely spaced intermeshing pins, with ⅛ clearance, mounted perpendicularly on the face of two circular disks with one rotating with respect to the other where the dispersion enters at the center of the stationary disk and exits at the periphery of the disks. Samples of the cooled dispersion were emulsified in the shearing device at four maximum shear rates of 4500 $s^{-1}$ to 11000 $s^{-1}$ where the maximum shear rate is defined as relative linear velocity of the outer most set of pins divided by the distance between the pins, ⅛". Each of the four samples collected had a residence time in the shearing device of approximately 2 seconds at a flow rate of 2200 lb/hr and the temperature rise in the samples ranged from 2° to 15° F. The sheared emulsified products were packaged in 1 pound tubs, tempered at 75° F. for 12 hours, and finally cooled to refrigeration temperatures. Observations are shown below:

| Sample | Shear Rate $s^{-1}$ | Yielding Stress Pa. | Yielding Viscosity cps. | Temp. Rise °F. | Power Input kW | Drop. Size of Water Phase Microns |
|---|---|---|---|---|---|---|
| 1 | 4,500 | 188 | 1,300,000 | 2 | 2.0 | 350 |
| 2 | 6,600 | 233 | 1,700,000 | 5 | 3.8 | — |
| 3 | 8,900 | 267 | 1,900,000 | 10 | 6.4 | — |
| 4 | 11,000 | 357 | 2,500,000 | 15 | 10.0 | 100 |

The yielding stress and yielding viscosity were measured using a Haake concentric cylinder viscometer with a programmed shear rate acceleration to determine the yield point. The above results show the relationship between the shearing rate and the droplet size of the dispersed water phase. As the shearing rate was increased, the yielding stress and yielding viscosity of the samples increased, as did the temperature rise in the samples undergoing shear. The lower shear rate resulted in a smaller rise in temperature, thus indicating a larger droplet size for the dispersed water phase of the water-in-oil emulsion. At shearing rates less than 4500 $s^{-1}$, the emulsion separated into its respective phases immediately. Further, visual inspection using a light microscope at 450 power and a measuring reticle in increments of 50 microns (0.05) of sample 1 taken at 4500 $s^{-1}$ yielded the largest consistent droplet size at approximately 350 microns (0.35 mm). Sample 4 was taken. at 11,000 $s^{-1}$ showed a similar measurement at a value of 100 microns (0.1 mm).

Similar rheological results for a commercially available low fat spread product having 48% vegetable oil where the yielding stress was measured as 293 Pa and where the yielding viscosity was measured as 2,350,000 cps at 75° F. Visual inspection of this commercial product yielded the largest consistent droplet size at approximately 100 microns (0.1 mm).

The power input measurements indicated show the total energy input by the shearing device for the production of 2,200 lb/hr. Based on prior art operating data, the power requirement for a prior at process at the same production rate would be approximately 20 kW. Hence, the process of this invention provides a substantial reduction in energy usage.

In comparing the flavor bursts between the samples collected, a perceptible difference was apparent with a smaller flavor burst resulting as the maximum shear rate was increased. The textural and flavor characteristics of the samples were deemed similar to products commercially available.

EXAMPLE 2

A formulation was prepared composed of 40 weight percent water phase and 60 weight percent oil phase and containing the following ingredients:

| Water Phase | |
| --- | --- |
| Water | 38.0 wt % |
| Salt, NaCl | 2.0 wt % |
| Flavor - water soluble Imitation butter | 0.02 wt % |
| Potassium sorbate | 0.001 wt % |
| EDTA | 75 ppm |
| Oil Phase | |
| Liquid soybean oil | 47.3 wt % |
| Solid soybean oil | 12.0 wt % |
| Flavor - oil soluble Imitation butter | 0.15 wt % |
| Beta carotene | 0.004 wt % |
| Emulsifying agent - distilled monoglycerides (<10% diglycerides) | 0.5 wt % |

The solid soybean oil was the same as described in Example 1. A dispersion of the ingredients was prepared as in Example 1 and equilibrated to 120° F. and then cooled to 45° F. at a cooling rate of 5° F. per second. The dispersion was held in a holding tube or cooling section of the heat exchanger for 30 seconds before being introduced into the mechanical shear device described in Example 1. Samples of the cooled dispersion were emulsified in the mechanical shear device at five maximum shear rates from 2100 $s^{-1}$ to 11,000 $s^{-1}$. The five samples had a residence time in the shearing device of approximately 2 seconds at 2200 lb/hr and the temperature rise in the samples range from 1° to 17° F. The sheared emulsified samples were handled as in Example 1. Observations are shown below:

| Sample | Shear Rate $s^{-1}$ | Yielding Stress Pa. | Yielding Viscosity cps. | Temp. Rise °F. | Power Input kW |
| --- | --- | --- | --- | --- | --- |
| 5 | 2,100 | 61 | 440,000 | 1 | 0.8 |
| 6 | 4,500 | 64 | 450,000 | 3 | 2.0 |
| 7 | 6,600 | 83 | 590,000 | 6 | 3.5 |
| 8 | 8,900 | 93 | 660,000 | 11 | 5.7 |
| 9 | 11,000 | 100 | 710,000 | 17 | 9.0 |

Comparison of the rheological measurements in Example 1 and Example 2 shows that as the percentage of water in the formulation decreased the yielding stress and yielding viscosity of the products decreased. With less water in the formulation, softer water-in-oil emulsion is obtained even with an increase in the concentration of the hard soybean oil.

These samples were judged to be similar to commercially available margarine-like products.

EXAMPLE 3

A formulation was prepared composed of 80 weight percent water phase and 20 weight percent oil phase and contained the following ingredients:

| Water Phase | |
| --- | --- |
| Water | 78.0 wt % |
| Salt, NaCl | 2.0 wt % |

-continued

| Flavor - water soluble Imitation butter | 0.02 wt % |
| --- | --- |
| Potassium sorbate | 0.001 wt % |
| EDTA | 75 ppm |
| Oil Phase | |
| Liquid soybean oil | 12.8 wt % |
| Solid soybean oil | 16.5 wt % |
| Flavor - oil soluble Imitation butter | 0.15 wt % |
| Beta carotene | 0.004 wt % |
| Emulsifying agent - distilled monoglycerides (<10% diglycerides) | 0.5 wt % |

The solid soybean oil was the same as specified in Example 1. A dispersion of the ingredients was prepared as in Examples 1 and 2 and equilibrated to 130° F. and then cooled to 40° F. at a cooling rate of 6° F. per second. The dispersion was held in a holding tube or cooling section of the heat exchanger for 30 seconds before being introduced to the mechanical shear device described in Example 1. Samples of the cooled dispersion were emulsified in the mechanical shear in a range of maximum shear rates from 5,550 $s^{-1}$ to 11,000 $s^{-1}$. The samples had a residence time in the shearing device of approximately 2 seconds at 2200 lb/hr and the temperature rise in the samples range from 2° to 14° F. The sheared emulsified samples were handled as in Example 1. Observations are shown below:

| Sample | Shear Rate $s^{-1}$ | Yielding Stress Pa. | Yielding Viscosity cps. | Temp. Rise °F. | Power Input kW |
| --- | --- | --- | --- | --- | --- |
| 10 | 5,500 | 514 | 4,100,000 | 2 | 2.4 |
| 11 | 6,600 | 558 | 4,500,000 | 4 | 3.4 |
| 12 | 8,900 | 608 | 4,900,000 | 9 | 6.3 |
| 13 | 11,000 | 635 | 5,100,000 | 14 | 10.7 |

These samples were viewed as comparable to diet spread products commercially available.

Accordingly, the process of the invention provides a process for making a comestible spread which can be practiced with low capital requirements and substantially reduced power requirements, while providing competitive products to those commercially available.

EXAMPLE 4

This example illustrates the preparation of an emulsified product containing a relatively high level of a hydrocolloid (i.e., about 1.0 percent by weight sodium caseinate). A formulation was prepared composed of 60 weight percent water phase and 40 weight percent oil phase. The separate phases contained the following ingredients (listed percentages are based on the total weight of the final 60/40 blended formulation):

| Water Phase | |
| --- | --- |
| Water | 57.0 wt % |
| Salt, NaCl | 2.0 wt % |
| Sodium Caseinate | 1.0 wt % |
| Flavor - water soluble Imitation butter | 0.02 wt % |
| Potassium sorbate | 0.001 wt % |
| EDTA | 75 ppm |
| Oil Phase | |
| Liquid soybean oil | 29.4 wt % |
| Solid soybean oil | 10.0 wt % |
| Flavor - oil soluble Imitation butter | 0.16 wt % |

| | |
|---|---|
| Beta carotene | 0.002 wt % |
| Emulsifying agent - distilled monoglycerides (<10% diglycerides) | 0.5 wt % |

The solid soybean oil was the same as described in Example 1.

An oil phase tank was loaded with the oil phase ingredients in descending order of concentration and equilibrated at temperature of 110° F.; all the oils were in a fully liquid state. A water phase tank was loaded with the water phase ingredients in descending order of concentration and equilibrated to 120° F. The metering rate of the water phase was set at 45 lb/min and the metering rate of the oil phase was set at 30 lb/min to yield the desired 60/40 water phase/oil phase injection ratio. With the batching tanks equilibrated and the metering rates set, the oil phase was metered through a 6-inch diameter, 48-inch long scraped-surface heat exchanger (Thermutator 648DE), where the oil phase was cooled to 20° F. for the nucleation and partial crystallization of the hard or solid soybean oil. The supercooled oil phase was further crystallized by metering into a 2-minute holding tube. Samples taken at the end of the holding tube had the consistency of a plastic solid, paste-like material. The partially crystallized oil phase exiting the holding tube was at 25° F.

The water phase was metered through a plate type heat exchanger; the temperature was 35° F. as the water phase exited the unit. The two phases (i.e., the water phase and the partially crystallized oil phase) where metered together (i.e., blended) and injected at 35° F. into the high shear device described in Example 1. The shearing rate was 8400 s$^{-1}$; the average residence time in the mixer head was about one second. The emulsified product exited the mixer at 44° F. Product samples were packaged in one pound tubs and stored at refrigeration temperatures.

The incorporation of the hydrocolloid in the emulsified produced resulted in a larger water phase droplet size and a larger perceived flavor burst as compared to a similar product prepared in essentially the same manner but without added hydrocolloid. Except for the increased flavor burst, the textural and flavor characteristics of the product was deemed similar to commercial products currently available.

Accordingly, this invention provides a process for making a comestible spread which can be practiced with low capital requirements and substantially reduced power requirements, while providing competitive products to those commercially available. This invention also provides a process for making a comestible spread with relatively high levels of hydrocolloids which can also be practiced with low capital requirements and substantiality reduced power requirements, while providing competitive products to those commercially available.

The various features of the invention which are believed to be new are set forth in the following claims.

That which is claimed is:

1. A process for producing a water-in-oil emulsion which is an edible margarine-like spread composition having a fat content of less than about 80 percent by weight and approximate consistency of margarine at room temperature, said process comprising:

(a) forming a water phase containing about 0.5 to 30 percent by weight of a hydrocolloid;
(b) forming a liquid fat phase containing substantially hard fat and a liquid soft fat;
(c) cooling the liquid fat phase to form a partially crystallized fat phase;
(d) blending the water phase and partially crystallized fat phase to form a liquid dispersion such that the crystallized fats from the partially crystallized fat phase remain substantially crystallized;
(e) subjecting the liquid dispersion to a shearing force sufficient to produce a water-in-oil emulsion wherein the maximum droplet size of the dispersed water phase is less than about 400 microns; and
(f) discharging the water-in-oil emulsion to provide an edible margarine-like spread composition having a fat content of less than about 80 percent by weight and approximate consistency of margarine at room temperature.

2. A process as defined in claim 1, wherein the liquid dispersion contains about 25 to 90 percent by weight water phase and about 10 to 75 percent by weight of the partially crystallized fat phase.

3. A process as defined in claim 2, wherein the liquid dispersion contains about 50 to 90 percent by weight water phase and about 10 to 50 percent by weight of the partially crystallized fat phase.

4. A process as defined in claim 2, wherein the ratio of hard fat to soft fat is about 0.1 to 0.8 in the liquid fat phase.

5. A process as defined in claim 4, wherein the hard fat has an iodine value of about 55 to 85 and a Wiley melting point of about 90° to 120° F., and the soft fat has an iodine value of about 115 to 150 and a Wiley melting point of less than 32° F.

6. A process as defined in claim 5, wherein the hydrocolloid is selected from the group consisting of calcium caseinate, sodium caseinate, whey, nonfat dry milk, maltodextrins, and coldset gelatins.

7. A process as defined in claim 5, wherein the water phase contains between about 1 to 10 percent by weight hydrocolloid.

8. A process as defined in claim 2, wherein the maximum droplet size of the dispersed water phase is about 100 to 350 microns.

9. A process as defined in claim 2, wherein the discharged water-in-oil emulsion is tempered.

10. A process as defined in claim 9, wherein the discharged water-in-oil emulsion is tempered at a temperature of about 70° to 80° F. for about 4 to 24 hours.

11. A process as defined in claim 2, wherein the shearing force is sufficient to provide a water-in-oil emulsion with an yielding viscosity of about 10,000 to 10,000,000 cps and a yielding stress between about 20 to 950 Pa.

12. A process as defined in claim 2, wherein the temperature rise during the formation of the water-in-oil emulsion is less than about 50° F.

13. A process as defined in claim 12, wherein the temperature rise during the formation of the water-in-oil emulsion is less than about 20° F.

14. A process as defined in claim 1, wherein the liquid fat phase is formed at a temperature of about 100° to 150° F. and the liquid fat phase is then cooled to a temperature of about 10° to 50° F. to form the partially crystallized fat phase.

15. A process as defined in claim 9, wherein the liquid fat phase is cooled and partially crystallized in a scraped surface heat exchanger.

16. A process as defined in claim 15, wherein the partially crystallized fat phase from the scraped surface heat exchanger is further crystallized in a holding or recrystallization tube at a temperature of about 15° to 55° F.

17. A process as defined in claim 14, wherein the initial temperature of the blended water phase and partially crystallized fat phase is about 30° to 50° F. when subjected to the shearing force and the temperature of the water-in-oil emulsion produced by the shearing force is (1) higher than the initial temperature of the blended water phase and partially crystallized fat phase and (2) about 40° to 70° F.

18. A process as defined in claim 14, wherein the initial temperature of the blended water phase and partially crystallized fat phase is about 30° to 50° F. and the blended water phase and partially crystallized fat phase are cooled during shearing.

19. A process for producing a water-in-oil emulsion which is an edible margarine-like spread composition having a fat content of less than about 80 percent by weight and approximate consistency of margarine at room temperature, said process comprising:
- (a) forming a water phase containing about 0.5 to 30 percent by weight of a hydrocolloid;
- (b) forming a liquid fat phase containing a substantially hard fat and a liquid soft fat where the ratio of substantially hard fat to liquid soft fat is between about 0.1 to 0.8, the substantially hard fat has an iodine value of about 55 to 85 and a Wiley melting point of about 90° to 120° F., and the liquid soft fat has an iodine value of about 115 to 150 and a Wiley melting point of less than 32° F.;
- (c) cooling the liquid fat phase to form a partially crystallized fat phase;
- (d) blending the water phase and partially crystallized fat phase to form a liquid dispersion such that the crystallized fats from the partially crystallized fat phase remain substantially crystallized;
- (e) subjecting the liquid dispersion to a shearing force sufficient to produce a water-in-oil emulsion wherein the maximum droplet size of the dispersed water phase is between about 100 and 400 microns; and
- (f) discharging the water-in-oil emulsion to provide an edible margarine-like spread composition having a fat content of less than about 80 percent by weight and approximate consistency of margarine at room temperature.

20. A process as defined in claim 19, wherein the hydrocolloid is selected from the group consisting of calcium caseinate, sodium caseinate, whey, nonfat dry milk, maltodextrins, and coldset gelatins; wherein the liquid fat phase is formed at a temperature of about 100° to 150° F. and the liquid fat phase is then cooled to a temperature of about 10° to 50° F. in a scraped surface heat exchanger to form the partially crystallized fat phase; wherein the partially crystallized fat phase from the scraped surface heat exchanger is further crystallized in a holding or recrystallization tube at a temperature of about 15° to 55° F.; and wherein the maximum droplet size of the dispersed water phase in the water-in-oil emulsion is between about 100 and 350 microns.

* * * * *